(12) United States Patent
Underwood et al.

(10) Patent No.: US 11,714,765 B2
(45) Date of Patent: Aug. 1, 2023

(54) SYSTEM AND METHOD FOR IMPLEMENTING A NETWORK-INTERFACE-BASED ALLREDUCE OPERATION

(71) Applicant: Hewlett Packard Enterprise Development LP, Houston, TX (US)

(72) Inventors: Keith D. Underwood, Powell, TN (US); Robert L. Alverson, Seattle, WA (US); Duncan Roweth, Bristol (GB); Nathan L. Wichmann, Plymouth, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 13 days.

(21) Appl. No.: 17/383,606

(22) Filed: Jul. 23, 2021

(65) Prior Publication Data

US 2023/0035657 A1     Feb. 2, 2023

(51) Int. Cl.
*G06F 13/20* (2006.01)
*G06F 12/10* (2016.01)

(52) U.S. Cl.
CPC .............. *G06F 13/20* (2013.01); *G06F 12/10* (2013.01); *G06F 2212/1024* (2013.01)

(58) Field of Classification Search
None
See application file for complete search history.

(56) References Cited

U.S. PATENT DOCUMENTS 9,250,987 B2 *  2/2016  Blocksome ............ G06F 9/546
11,328,222 B1 *  5/2022  Matthews ........... H04L 49/3027
11,516,149 B1 * 11/2022  Matthews ............. G06N 3/063
(Continued)

OTHER PUBLICATIONS

Dryden et al., "Communication Quantization for Data-Parallel Training of Deep Neural Networks", Proceedings of the Workshop on Machine Learning in High Performance Computing Environments, Nov. 2016, pp. 1-8.

(Continued)

*Primary Examiner* — Henry Tsai
*Assistant Examiner* — Christopher A Bartels
(74) *Attorney, Agent, or Firm* — Park, Vaughan, Fleming & Dowler LLP

(57) ABSTRACT

An apparatus is provided that includes a network interface to transmit and receive data packets over a network; a memory including one or more buffers; an arithmetic logic unit to perform arithmetic operations for organizing and combining the data packets; and a circuitry to receive, via the network interface, data packets from the network; aggregate, via the arithmetic logic unit, the received data packets in the one or more buffers at a network rate; and transmit, via the network interface, the aggregated data packets to one or more compute nodes in the network, thereby optimizing latency incurred in combining the received data packets and transmitting the aggregated data packets, and hence accelerating a bulk data allreduce operation. One embodiment provides a system and method for performing the allreduce operation. During operation, the system performs the allreduce operation by pacing network operations for enhancing performance of the allreduce operation.

18 Claims, 6 Drawing Sheets

(56) References Cited

U.S. PATENT DOCUMENTS

| | | | | |
|---|---|---|---|---|
| 2011/0078249 | A1* | 3/2011 | Blocksome | G06F 9/544 709/206 |
| 2011/0219208 | A1* | 9/2011 | Asaad | G06F 9/06 712/12 |
| 2013/0018947 | A1* | 1/2013 | Archer | G06F 15/781 709/204 |
| 2013/0340977 | A1* | 12/2013 | Singleton | F28D 15/02 165/104.11 |
| 2013/0342993 | A1* | 12/2013 | Singleton | H05K 7/20836 361/690 |
| 2013/0343207 | A1* | 12/2013 | Cook | H04L 43/0852 370/252 |
| 2016/0283897 | A1* | 9/2016 | Curtland | G06Q 10/087 |
| 2018/0262402 | A1* | 9/2018 | Kadav | H04L 41/12 |
| 2022/0114440 | A1* | 4/2022 | Dong | G06N 20/00 |
| 2022/0141620 | A1* | 5/2022 | Sullivan | H04W 4/029 455/456.1 |
| 2022/0232111 | A1* | 7/2022 | Ford | H04L 45/566 |
| 2022/0255897 | A1* | 8/2022 | Miele | G06N 3/02 |
| 2022/0413889 | A1* | 12/2022 | Bhatewara | G06F 9/45558 |

OTHER PUBLICATIONS

Faanes et al., "Cray Cascade: A scalable HPC System Based on a Dragonfly Network", Proceedings of the International Conference on High Performance Computing, Networking, Storage and Analysis, vol. 103, 2012, 9 pages.

Goyal et al., "Accurate, Large Minibatch SGD: Training ImageNet in 1 Hour", Computer Science, Computer Vision and Pattern Recognition, vol. abs/1706.02677, Apr. 2018. pp. 1-12.

Graham et al., "Scalable Hierarchical Aggregation and Reduction Protocol (SHARP)™ Streaming-Aggregation Hardware Design and Evaluation", International Conference on High Performance Computing, Lecture Notes in Computer Science, vol. 12151, 2020, pp. 41-59.

Hazelwood et al., "Applied Machine Learning at Facebook: A Datacenter Infrastructure Perspective", 2018 IEEE International Symposium on High Performance Computer Architecture (HPCA), vol. 1, 2018, 10 pages.

Rabenseifner R., "Optimization of Collective Reduction Operations", International Conference on Computational Science, Lecture Notes in Computer Science, vol. 3036, 2004, pp. 1-9.

* cited by examiner

SYSTEM AND METHOD FOR IMPLEMENTING A NETWORK-INTERFACE-BASED ALLREDUCE OPERATION

BACKGROUND

Field

This disclosure is generally related to the field of data processing in a distributed computing system. More specifically, this disclosure is related to a system and method for implementing a network-interface-based allreduce operation.

Related Art

Emerging workloads such as Artificial Intelligence (AI), specifically Deep Learning (DL) training applications are rapidly growing and the computationally intensive workload involves parallel computing, e.g., Graphic Processing Unit (GPU) accelerated computing. Data parallel implementations of DL training involve bulk data collective operations. Collective operations are a fundamental primitive in parallel computing. They provide synchronization and global data exchanges necessary to coordinate processes across numerous systems in a distributed computing system. In a collective operation, every process participates and contributes to the result. Further, when these collective operations are parallelized over an increasing number of GPUs, the amount of time spent performing host-based collective operations can be a critical factor in determining overall performance. In other words, inefficiencies in the collective operations can reduce the value of distributing the computation.

Some of the existing systems offload the collective operations to the network hardware, e.g., to a network switch, to improve the performance of DL training. However, such switch-based implementation of the collective operations can add significant amount of complexity in terms of software and/or hardware to the switch. Therefore, challenges exist with designing an efficient collective operation and associated network hardware that can scale effectively to match the rapid growth in the number of GPUs and the number of compute nodes in a parallel computing environment.

BRIEF DESCRIPTION OF THE FIGURES

In the figures, like reference numerals refer to the same figure elements.

DETAILED DESCRIPTION

Figure 1:
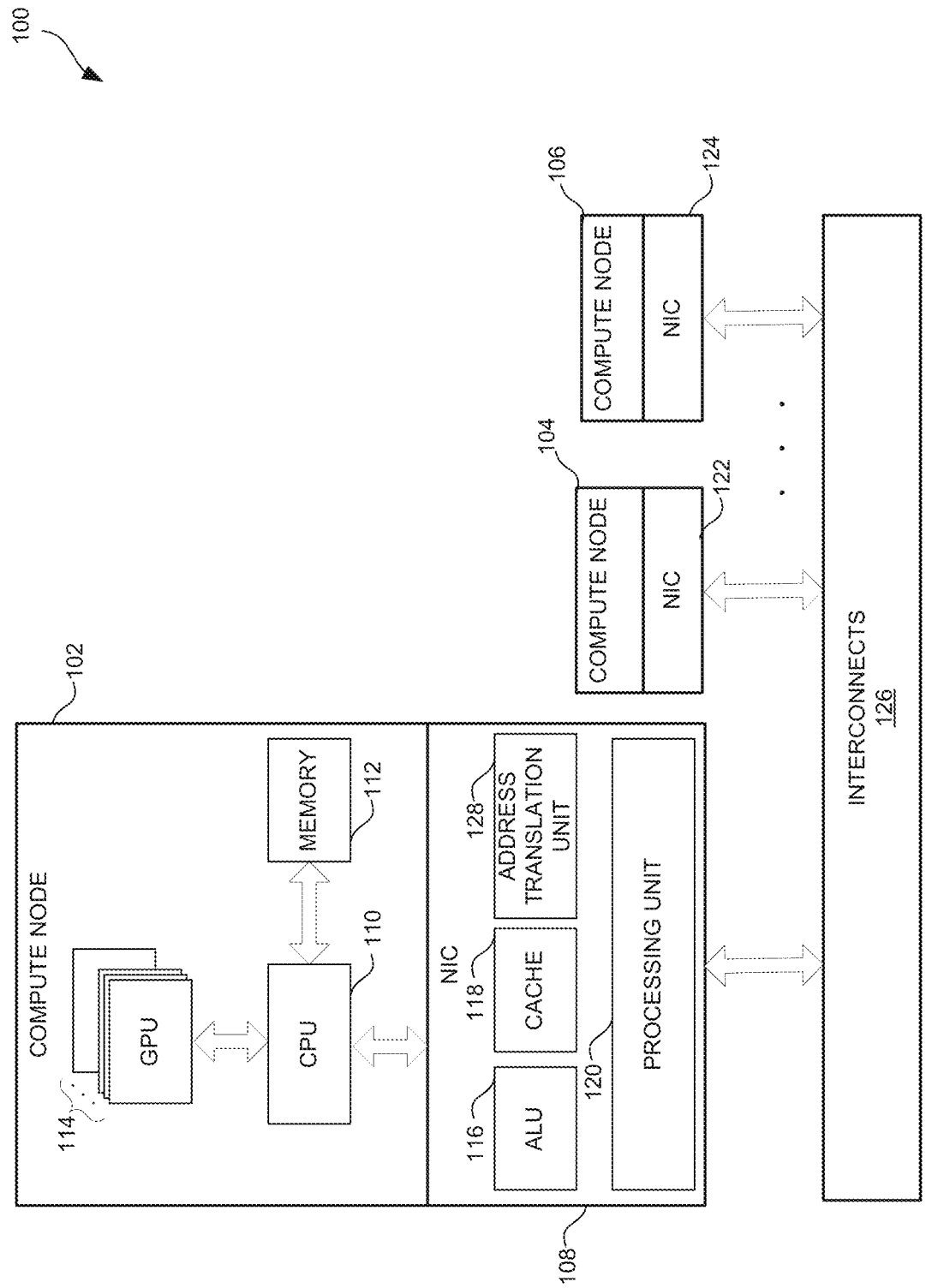
FIG. 1 illustrates an exemplary system architecture for a distributed computing system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

Overview

Embodiments described herein solve the technical problem of designing an efficient collective operation and a network interface hardware to accelerate the collective operations so that they can: scale better with the increasing number of computer nodes and/or GPUs in a parallel computing environment; and can optimize the fundamental communication operation for DL training workloads.

Allreduce is a collective operation in which every compute node contributes a partial result and the allreduce can combine the results and distribute them to all the participating processes.

Due to the rapid growth in AI applications, there has also been a steady increase in the bandwidth utilization of an interconnect network in a distributed computing system, e.g., collective operations in DL training can be megabytes in size. DL model sizes are steadily growing, and DL training increasingly uses parallel GPU accelerated computing to reduce time contributed by the computation. Further, data parallel implementations of DL training use bulk data allreduce to aggregate gradients computed in back-propagation in each of the data parallel instances, i.e., in each of the minibatches. Moreover, as the computation is parallelized over an increased number of GPUs, the time spent performing allreduce can result in a critical factor for DL training.

Existing systems implement the collective operations on the host or compute nodes. Host-based collectives incur overhead from delivering data into host memory and then processing that data with a CPU core. It may be difficult for one CPU core to load at a high rate, e.g., at 50 GB/s, from memory to match the network bandwidth and add to a temporary buffer at that rate. Further, GPUs and accelerators can be a poor match for executing a network software stack. Therefore, offloading the collective operations to the network hardware, e.g., a network adapter or switch, can improve the performance of parallel computing.

Switch-based streaming collectives are constrained by in limited storage and floating-point capability in the switch. This is because the buffer space and wiring density can compete for switch area. For example, placing sufficient bfloat16 Arithmetic Logic Units (ALUs) at every switch port would be prohibitive. Placing them on a subset of ports would constrain their usefulness and/or limit performance. Furthermore, limited buffering in the switch can mean that a given switch can only participate in a small number of collective trees, which is a limitation for application placement in a cloud-like datacenter. Moreover, the switch-based implementation may not scale to support the rapid growth in the number of GPUs.

For example, a switch-based implementation of allreduce, at 100 KB sizes, may provide a significant setup cost overhead. This latency-based degradation is expected to increase significantly for larger networks, and fragmented job placement can disable the capability.

Some of the embodiments described herein solve the above-mentioned problems by providing a system and method for a novel implementation of collective operation, e.g., allreduce algorithm; and by providing novel network interface card (NIC) enhancements to accelerate the novel bulk data allreduce algorithm and a broad class of bulk data collective operations. In one embodiment, the NIC-based solution can leverage the connection logic and a set of other NIC functions built into the NIC. Moreover, the novel NIC-based solution can allow every job running on a large system to perform collective operations using its allocated set of NICs. In addition, the NIC enhancements can enable overlapped execution of bulk data collectives with the gradient computation on the compute nodes, e.g., CPU or GPU.

The novel bulk data allreduce can exploit changes in the balance bandwidth versus latency in modern networks. Further, the novel allreduce can leverage low overhead, high message rate implementations on the NIC in conjunction with high bisection bandwidth, low diameter, non-blocking topologies to enable a new class of collective algorithms.

Specifically, the novel approach for allreduce can achieve the theoretical limits of performance for a NIC-based implementation. Furthermore, a system is provided that can: extend the scalability with multi-stage implementation of the allreduce algorithm; can apply NIC control structures to manage sequencing of operations; and apply the control structures to pace the data flow so that the NIC-based implementation is practical and can scale effectively. Moreover, to optimize the performance of novel allreduce algorithm, the NIC can include: an integrated ALU that matches the network rate; a cache for optimizing the latency for combining and forwarding results; and a novel tagging approach to identify which operations can target the cache.

System Architecture

FIG. 1 illustrates an exemplary system architecture for a distributed computing system, according to one embodiment. In the example shown in FIG. 1, distributed computing system 100 can include a plurality of computer nodes 102-106, with each compute node including central processing unit (CPU) 110 socket which can represent a processor group. A processor group can include one or more processors housed in a CPU socket. For simplicity, only one processor is shown. The CPU socket 110 can be coupled to a plurality of interconnected GPUs 114 which can correspond to multiple DL accelerators.

Further, CPU 110 in each compute node can be coupled to a NIC, e.g., 108, 122, and 124 are coupled to CPU(s) in corresponding compute nodes 102, 104, and 106, respectively. Furthermore, each processor within a compute node can be coupled to a plurality of memory devices 112, e.g., dynamic random-access memory (DRAM), using Double Data Rate (DDR) Dual In-line Memory Module (DIMM) slots and other memory technologies, e.g., high bandwidth memory (HBM). Interconnects 126, e.g., Infiniband or Ethernet, can facilitate inter- node traffic across nodes 102, 104, and 106, via NICs, e.g. 108, 122, and 124.

In one embodiment, the allreduce operations are offloaded to an enhanced NIC, e.g., 108, 122, and 124. The NICs can facilitate the communication between different compute nodes, i.e., 102, 104, and 106, in distributed computing system 100 via interconnects 126. The system associated with a NIC can provide a novel process for computing allreduce and can also include NIC hardware enhancements to accelerate this novel process.

Some of the embodiments described herein can provide a distributed computing system 100 that can support different variations of high-performance computing (HPC) Ethernet NIC Application-Specific Integrated Circuit (ASIC), e.g., 200 Gb/s HPC Ethernet NIC, 400 Gb/s, and/or 800 Gb/s. HPC Ethernet NIC, e.g., 108, can provide low latency, can enable user mode access to the network, and can offload critical path message processing functions for HPC programming models, e.g., Message Passing Interface (MPI) or Symmetrical Hierarchical Memory (SHMEM) standards.

Further, data can be transmitted from and delivered to user-space buffers without the intervention of the operating system kernel. One variation of the HPC Ethernet NIC, e.g., 200 Gb/s, can provide both single element network atomic operations, e.g., floating point add and triggered operations. Triggered operations can provide the ability for the system to setup network operations that can asynchronously trigger with the completions of other network operations without the involvement of software.

In one embodiment, the performance of a novel collective operation, i.e., a novel allreduce algorithm, is improved with enhancements to the NIC hardware. In other words, NIC 108 hardware can include an Arithmetic Logic Unit (ALU) 116, a cache 118, and a processing unit 120. Processing unit 120 can apply ALU 116 to perform arithmetic operations on bulk data and organize the data. Therefore, the integration of ALU 116 in NIC 108 can reduce the number of requests sent to host CPU 110 which can result in significant reduction in the latency involved. Furthermore, ALU 116 can combine the received input data from different compute nodes at a maximum possible rate, e.g., at line rate.

In other words, NIC 108 hardware is enhanced to accumulate the incoming data into a temporary local buffer, e.g., cache 118, at full network bandwidth. Specifically, this can be achieved with a line rate ALU 116. For example, ALU 116 can operate on 128 bytes, (e.g., 16 double precision, 64 "Brain floating-point" format (bfloat16)), per cycle to match a network rate of 800 Gb/s.

Local cache 118 can optimize latency for combining and then forwarding results. Further, local cache 118 can allow a data payload of an arbitrary size. One of the problems encountered when NIC 108 includes a cache is that the cache may not be coherent and managing such a non-coherent cache can be a problem. To solve this problem, one embodiment includes an address translation unit or infrastructure 128 in NIC 108 that can control which regions of the memory can be cached in NIC 108 in a non-coherent way. Address translation unit 128 can be extended to enable a region to be flagged as being cacheable to use local cache 118, thereby separating cacheable memory from non-cacheable memory. In other words, address translation unit 128 can implement a novel tagging operation that can identify which operations can target certain regions in cache 118. For example, address translation unit 128 can identify an address associated with the operations and determine whether this address belongs to a cacheable region or a non-cacheable region. Such a flagging/tagging operation is desirable to simplify software management of the cache to arrive at a consistent state, thereby providing control of information in the cacheable memory region to enable a consistent state for the information associated with the operations. Other operations are provided to control use of cache 118 which enable software to flush one or more cache lines associated with a particular user, process, or job.

Further, it is also desirable to transmit results from the buffer instead of pushing the results to host memory, e.g., memory 112. The system can enable this by defining on-die interactions. In addition, the system can leverage triggered operations to pace (or add flow control to) operations across all participants, e.g., compute nodes in the network, thereby enabling the novel allreduce algorithm to maximize the re-use of cache data and minimize the cache size needed. Leveraging triggered operations to pace (or add flow control to) network operations is described below in the subsection Allreduce with Triggered Operations to Add Flow Control.

Allreduce Algorithm

Figure 2:
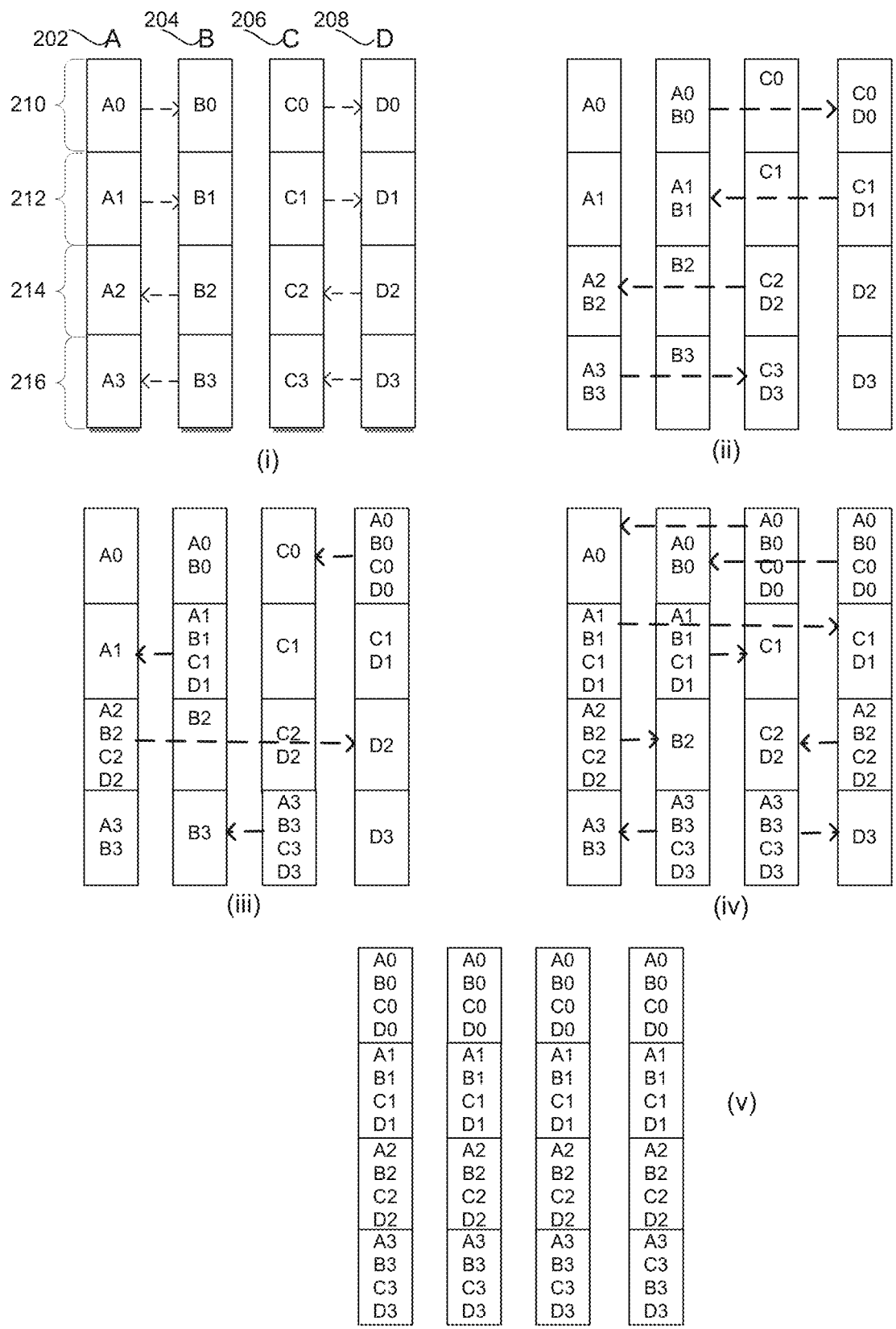
FIG. 2 illustrates an example of a typical allreduce algorithm.

FIG. 2 illustrates an example of a typical allreduce algorithm. The example shown in FIG. 2, illustrates a high-level hierarchical implementation of an allreduce algorithm, e.g., a Rabenseifner algorithm (RA), which involve steps (i)-(v) for a four-node distributed computing system. The allreduce algorithm shown in FIG. 2 represents a tree-like implementation of the RA. Each node, e.g., nodes A 202, B 204, C 206, and D 208, can include a vector, i.e., a vertical column, with a number of elements. The RA can divide the vector in each node into four segments, e.g., 210-216. FIG. 2 (i) can represent a first step in RA, in this step (i), node A 202 can send half of the data in the vector, i.e., vector elements A0 and A1, to node B 204. This is indicated by dashed arrows between nodes A 202 and B 204, i.e., from A0 to B0 and A1 to B1. Node B 204 then combines the incoming data with its local data to create two new partial results, i.e., node B 204 will include the partial results {A0, B0} and {A1, B1} in the first and second segment of its vector. At a similar time, node C 206 and node D 208 perform a similar exchange of data.

At step (ii), the remaining "fan-in" for each partial result can continue up the tree to form a full result for the first segment on node D, the second segment on node B, the third segment on node A, and a fourth segment on node C. The steps (i) and (ii) are essentially a binomial tree "fan-in" with a radix of two, and four concurrent trees are used with one tree rooted at each node. At step (iii), the RA begins a tree-based fan-out process and copies the partial results "down the tree." At step (iv) RA continues to perform the tree-based fan-out process and at step (v) the RA ensures that a full result is stored on each node in the distributed computing system.

Tree-based allreduce approaches were designed to scale to hundreds or even thousands of nodes in an era when point-to-point latency was low relative to the time to send a unit of data. Recently, the balance of system performance has shifted so that point-to-point latency is large relative to the time to transfer moderate sized payloads. This change introduces an opportunity for new approaches. Further, it is also desirable to develop an allreduce mechanism that can leverage simple NIC-based flow control schemes to enable use of practical cache size of the NIC.

For example, some of the earlier approaches needed approximately 5.5 μs to send a 4 KB packet (1.5 μs of network latency plus 4 μs for packet serialization). At that point in time, NIC could inject 1 GB/s of bandwidth payload and achieve an end-to-end latency of 1.5 μs and the message rate approached 1 million messages per second (1 Mmsgs/s). This resulted in implementations to be biased to generate a smaller number of larger messages.

With recent developments in AI cluster computing systems, the packet latency has dropped to approximately 1 μs and 160 ns of that time dedicated to packet serialization. The allreduce algorithm was expected to be designed to hide latency. A binary tree exposes one-way latency eight times on a 256-node system. In one embodiment, the hardware enhancements to NIC can reduce this latency, e.g., to ⅓ of the time, when implementing the flat variant of RA or a flat version of allreduce algorithm (FAA).

Figure 3:
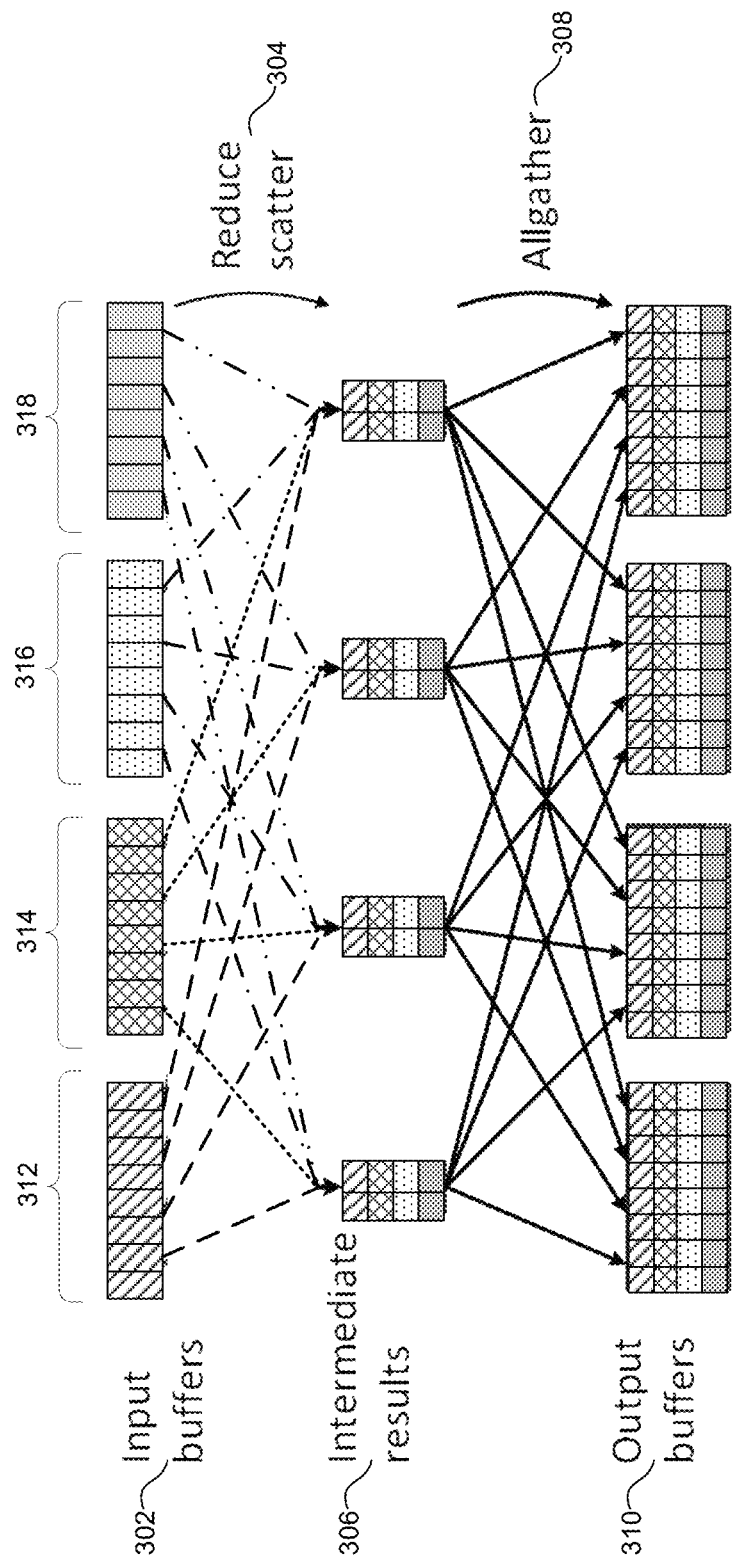
FIG. 3 illustrates an exemplary allreduce operation, according to one embodiment.

FIG. 3 illustrates an exemplary allreduce operation, according to one embodiment. The example shown in FIG. 3 illustrates a FAA and this flat variant can yield significant improvements for bulk-data operations when prototyped in software on HPC cluster or AI cluster computing. The FAA does a similar decomposition of a vector into a number of segments at each node, i.e., similar to RA shown in FIG. 2, but the FAA can over-decompose an array of data elements to be processed. FIG. 3 illustrates an example of a four node FAA in which each input buffer is decomposed into eight transfers. The FAA can simultaneously send the first two blocks from every node, i.e., nodes 312-318, to node 312; the second two blocks from every node to node 314; the third two blocks from every node to node 316; and the fourth two blocks from every node to node 318. This phase is denoted as reduce scatter phase 304 in which the FAA can form a quarter of the partial results or intermediate results 306 on each node. Further, each node can send intermediate results 306 to every other node (this process is indicated as an "Allgather" operation 308) which can result in output buffers 310 including full result on every node.

Figure 4:
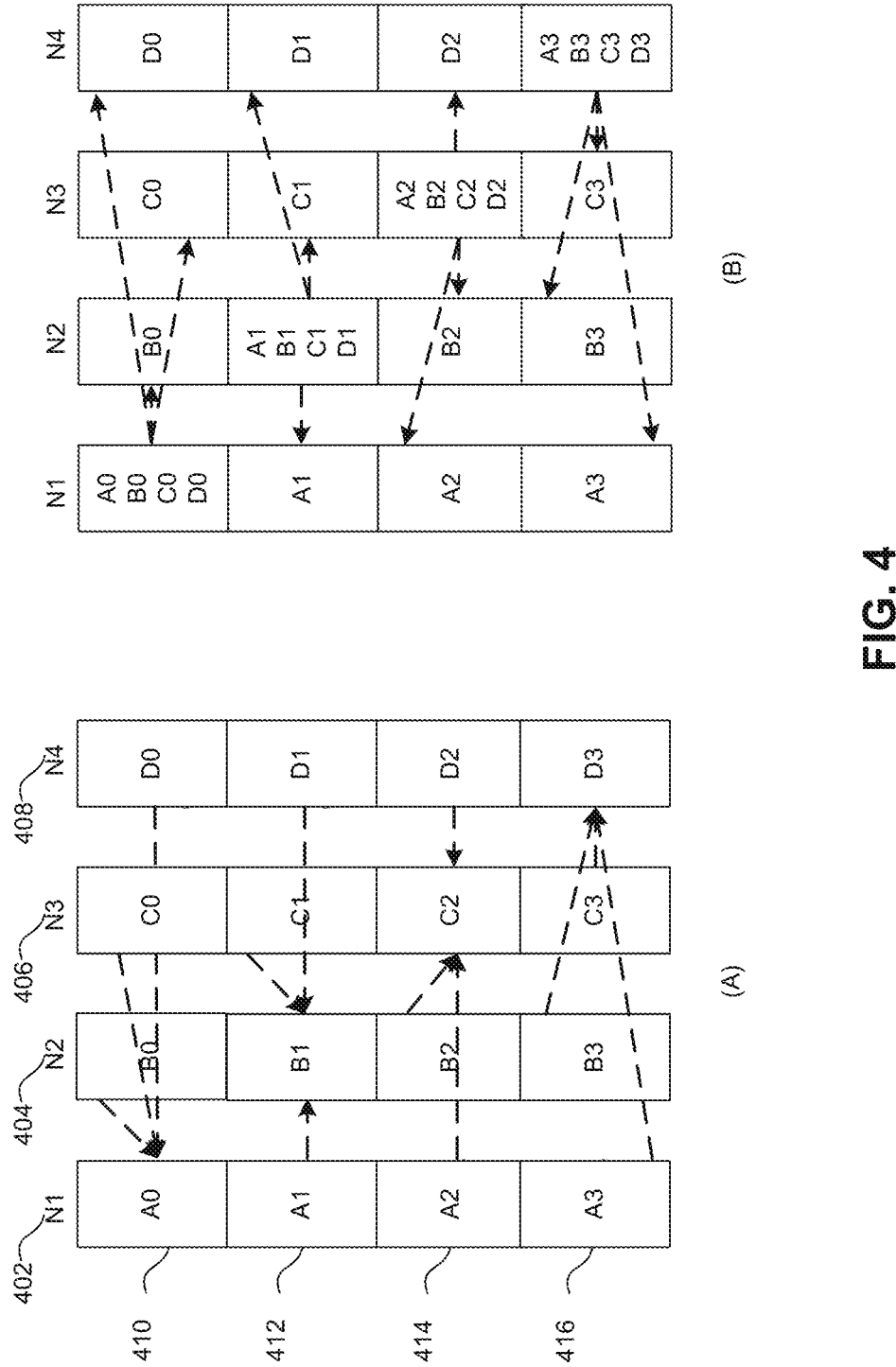
FIG. 4 illustrates an exemplary allreduce operation with segmentation and distribution of data segments among compute nodes in a network, according to one embodiment.

FIG. 4 illustrates an exemplary allreduce operation with segmentation and distribution of data segments among compute nodes in a network, according to one embodiment. In the FAA, each of the N nodes, i.e., nodes N1 402, N2 404, N3 406, and N4 408, can compute a final result for $1/N^{th}$ of the input array. The FAA divides the input array into N segments, i.e., segments 410-416, with each segment corresponding to a size of $1/N^{th}$ of the input array. Initially, the FAA can receive a $K^{th}$ segment of the input array from a corresponding $K^{th}$ segment of an input buffer in every other node (shown in FIG. 4 (A) with four nodes and four segments). The dashed line arrows indicate the flow of data between the nodes. In FIG. 4(B), FAA broadcasts the results in the $K^{th}$ segment to a corresponding $K^{th}$ segment in every other node. In other words, a node K can send a $K^{th}$ segment of its input array to $K^{th}$ segment in the other nodes, i.e., node K can send N−1 copies of $K^{th}$ segment in its input array. Further, node K can receive N−1 inputs for its $K^{th}$ segment of size 1/N elements. Then node K receives N−1 segments it did not compute from the other nodes. The total transmitted data is 2*(N−1)/N*(input array size) and the total received data is 2*(N−1)/N*(input array size).

A FAA can have a theoretical limit of half of the bandwidth associated with a node being delivered to allreduce. This is because the FAA transmits total size of the allreduce, i.e., the input vector is split out to all the peer nodes, and then the results are replicated to all the nodes, i.e., $1/N^{th}$ of the data is sent to each of the N nodes. For example, in a distributed computing system with 32 nodes and implementing the FAA in HPC Ethernet NIC at 800 Gb/s can achieve 30% of the wire rate at 128 KB and can approach 50% at 2 MB. As the distributed computing system scales, the hardware associated with HPC Ethernet NIC at 800 Gb/s can continue to achieve a high fraction of the wire rate. For example, at 1024 nodes, the 128 KB allreduce can only sum 128B per node, but is estimated to achieve 20% of the wire rate, which can increase to 45% for a 2 MB allreduce.

Since FAA can segment the data based on the number of nodes, the input data size has to satisfy some size constraints when the node count exceeds a specific threshold. For example, when the per node segment size crosses below 512B the payload efficiency on the wire may start to drop.

Allreduce With Triggered Operations to Add Flow Control

Nodes routinely enter a collective operation at wildly disparate times. This can cause the amount of data that would be cached on the NIC to be as large as the collective fragment on the node, which can be a problem. Therefore, designing an allreduce to add flow control can be important to align the timing.

A triggered operation is an operation that is scheduled to occur when a counting event reaches a threshold. Counting events are configured to be incremented by a value through an application programming interface (API) based on specific NIC events, e.g., the completion of an operation, the addition of a new buffer for NIC usage, etc. In other words, counting events are provided to track completion of network operations. Portals and libfabric type of APIs can support counting events and triggered operations. In the following, Portals API has been used as an example to describe the allreduce with triggered operations to add flow control.

Portals can provide a network programming interface for HPC systems that can support MPI and/or SHMEM standards. For example, "Put" operations can move data from one node to another and atomic operations perform arithmetic at a remote node. For example, the system can apply the following triggered operations: TriggeredPut notification to notify that a local MEAppend operation has completed; TriggeredAtomic operation to send the input data; and TriggeredPut notification to disseminate the final result.

For example, on an HPC Ethernet NIC, a system can access (or expose) the host memory buffers using an "Append" command (e.g., MEAppend or LEAppend in the terminology of Portals). When the append operation completes, the system can configure a Link event to increment a counting event.

A system implementing the allreduce algorithm or FAA with triggered operations can initially expose an accumulation buffer (with persistent MEAppend or LEAppend) and the Link event can be used as a counter to enable peer notifications. The system can then initiate a PtlTriggeredAtomic to each peer node (e.g., an atomic to Node N1 402 for segment 410 in FIG. 4). The system can then initiate a "0" byte PtlTriggeredPut to each peer (which are waiting on the one Link event). When the system identifies an arrival of a "Put" operation from, e.g., Node N4 408 in FIG. 4, the system may release the corresponding PtlTriggeredAtomic to Node N4. When the system receives all inputs for a segment, the system can apply a PtlTriggeredPut to send the combined result in the segment to every other node. To perform this sequence of operations the system may require one counter per-peer and one append per-peer. Further, the appended entries may be associated with accepting the "Put" operations that release the PtlTriggeredAtomic. This can be a reasonable solution for a small node count. Improved scalability with large node count is addressed below in the subsection Scaling of Triggered Operations.

Since the cache on the NIC is of limited size, controlling the flow of data in a reasonable way is important so that the cache is not over-run and the latency optimization provided by the cache is preserved. Therefore, to improve the performance of the allreduce algorithm (FAA) and to efficiently use the cache, the system can also apply triggered operations with pacing, i.e., by adding flow control to the triggered operations. For example, when the input array is large relative to the number of nodes, the system can perform initiator side pacing. When the number of nodes is large relative to the array, the system can apply target side pacing. Here, initiator refers to the node initiating the atomic operation and the target refers to the node being targeted by the atomic operation. In general, to implement pacing, a node that has a large amount of data to send has to fragment that data into one command per unit of flow control.

To implement initiator side pacing, the system can apply a counter to count incoming atomic operations. The system can stage the thresholds for an outgoing TriggeredPut to pace incoming atomic operations. For example, the system may release first hundred TriggeredPut operations when the append operations complete. Then, as each atomic operation completes, the system may release one more TriggeredPut.

Performing scheduling for this type of pacing can be critical. The TriggeredPut operations that trigger the release of a peer's TriggeredAtomic may not be synchronized so that every node sends a release to Node N1, e.g., Node 402 in FIG. 4, and then sends a release to Node N2, e.g., Node 404 in FIG. 4, etc. The order in which the TriggeredPut operations are performed can be controlled by software and the order in which the system provides these operations to the NIC can be the order in which they will be issued.

For larger operations, the system can implement target side pacing. In other words, the system can perform target side pacing when the per-node segment is large. For example, if each node has one hundred packets to send, the system can apply the completion count for an atomic operation to release additional atomic operations.

Scaling of Triggered Operations

The number of triggered operations required can depend on both the size of the input array and the number of nodes. The minimum number of triggered operations (for triggered implementation) can be three triggered operations per peer node. For example, the three triggered operations can include: TriggeredPut notification to notify that a local MEAppend operation has completed; TriggeredAtomic operation to send the input data; and TriggeredPut notification to disseminate the final result. To enable the flow control concepts, the system can expand the number of TriggeredPut notifications and TriggeredAtomic operations to the number of packets in the payload. This is because the system may require one TriggeredAtomic operation for each unit of flow control (denoted as FragmentSize in equation (1) below). Thus, the total number of triggered operations can be given by:

$$TrigOps = 2 * \max\left((\text{Node count}), \frac{\text{Size}}{\text{FragmentSize}}\right) + (\text{Node Count}) \quad (1)$$

Equation (1) indicates that there may not be less than one operation per peer node, and the bulk data may be divided to FragmentSize increments for flow control. For example, for small input sizes, e.g., 1 MB or less, with a fragment size of about 2 KB, and a node count above a typical DL scaling threshold (e.g., a node count of 512), the level of resources provided by HPC Ethernet NIC 200 Gb/s may be sufficient. However, for larger node counts, e.g., 1K nodes, and for large input size (e.g., 4 MB), the number of pending operations may be doubled.

The system can reduce the number of triggered operations for large message sizes by adjusting the granularity of flow control. For example, the system can adjust the fragment size from 2 KB to 16 KB. Although, such adjusting would result in eight data packets, the system may issue them with a single command.

Furthermore, the system can trigger triggered operations at nodes only to delay them behind the MEAppend operation. If the sequence of operations were setup such that the system starts the MEAppend operation, followed by issuing the TriggeredAtomic operations, and issuing the TriggeredPut notifications, then the TriggeredPut notifications may not be pending as triggered operations. In other words, the system may issue the TriggeredPut notifications immediately, because the MEAppend would have already completed.

Further improving the number of pending triggered operations may require additional trade-offs. For example, one such trade-off may be to involve software to initiate the fan-out of the result. After the system accumulates the results, the system may apply a triggered event to wake a thread that can then fan-out the results. Such a trade-off may remove a certain number of triggered operations that is equivalent to the number of nodes from the overall triggered operation count.

Another approach/trade-off can optionally be to use a reliable multicast, e.g., hardware multicast, to send the result to the peers. This may significantly reduce the number of operations performed by each node and may need appropriate software intervention to enable reliable multicast. This can result in a reduction in the number of triggered operations by approximately the node count.

Scaling of Per-Peer Counter

The existing allreduce approaches include a counter per-peer node which can contribute to a significant performance degradation. In the following, different approaches are described for reducing the number of per-peer counter.

The system utilizes a per-peer counter only when the given peer is ready for the notifications, i.e., the given peer has created a buffer to receive the data. However, the system can eliminate this requirement to have a per-peer counter by performing a barrier operation (which refers to a type of synchronization operation) after performing the MEAppend. At this point, the first phase of the FAA can be an all-to-all type of operation where the data movement can be replaced by atomic operations.

For example, with the application of the barrier operation, the system can schedule the transfers to reduce contention (e.g., first PtlAtomic to peer node N+1, second to peer node N+2, etc.). The system may also apply other approaches for reducing per-peer counter, e.g., by including schedules that can consider loading on the global communication links.

Applying a barrier operation may expose load imbalance in the application. Further, the barrier operation may prevent progress of work on nodes that are ready. In addition, a round-trip to the NIC for the MEAppend may occur before the barrier operation.

Another approach for reducing the number of per-peer counters is to apply one counter per-M-peers instead of one counter per-peer. Therefore, when the system increments the counter to M, the system may start to release TriggeredAtomic operations. This approach would divide the required number of counters by a factor of M, e.g., M of only eight can cover many use cases. In this approach, since an increment of a counter may not reflect which peer node was ready for more data, each increment phase can be synchronous. For example, the system may release additional atomic operations for each increment by M or the system may accept the uncertainty and send notifications to a destination that is pending a flow control release. This approach can be viewed as multiple overlapped M-node barriers followed by all-to-all communications with subsets. Further, it can be unlikely that this approach can result in a single global barrier approach.

Reproducibility of Allreduce Algorithm

Implementing the FAA with atomic operations may provide different results for different iterations because floating point is not associative for some operations. A simple approach to make the FAA reproducible is by defining an order-independent summation operation. However, such an approach may require that the length of the buffer in the NIC for streaming atomic operations be wide enough to store intermediate results. In addition, converting the intermediate representation may lose the order independent properties and can result in problems associated with buffer scheduling. Moreover, the buffer may never be flushed back to host memory.

Another approach to order independent arithmetic is to apply the atomic updates in the same order each time. This may require some level of local buffering to store the data that has arrived in an undetermined order so that the arithmetic can be performed in a predetermined order. This approach can be applied in two ways: (a) pull the data to a local buffer and then apply the arithmetic; and (b) provide buffers to store the incoming atomic operations before issuing the notification messages, i.e., integrating the buffering with flow control. Both schemes may require a similar amount of buffering. In both cases, the same amount of data must be outstanding to cover the round-trip bandwidth delay product, and buffering must be available for that data in both cases.

Hierarchical Allreduce Algorithm

Flat implementations of allreduce can lead to resource requirements that scale linearly with the number of nodes, which may be a problem for large number of nodes. In one embodiment, a hierarchical FAA can be implemented with two stages. For example, when a network includes 4096 nodes, these nodes can be structured as a 64×64 array. In a first stage of the allreduce, each of the 64 rows in the 64×64 array can perform FAA over the entire input. The 64 nodes in a row may now have the partial result for that row. In a second stage, each of the 64 columns may perform FAA over their entire partial result from the first stage. Now, all 4096 processes, i.e., corresponding to the 4096 nodes, would have the final result. As a theoretical limit, this two-stage implementation of FAA may only have a factor of two impact on the performance.

However, the second stage of the FAA has to be performed in an order independent way, so that every node gets the same results. Otherwise, the non-associative nature of floating-point may yield different results in each column for the SUM and PRODUCT operations. This could be done by preserving the reproducible data or buffering the data to guarantee a known ordering representation (described above in the subsection Reproducibility of Allreduce Algorithm). Preserving the data representation has a significant impact on total network payload, e.g., can expand bandwidth by a factor of four. Furthermore, in a two-stage FAA, a square decomposition is likely to provide optimal performance.

The two-stage hierarchy may create abundant network traffic and achieving order independence can be challenging. In one embodiment, an alternative approach is provided in which each row can perform FAA, and then in a second stage only the first column can perform FAA. A third stage is included that can perform the fan-out of the final result. Such a three-stage approach may eliminate the bandwidth expansion needed for reproducible representations.

An extension to this three-stage approach can involve the second stage using one node from each row (e.g., diagonally in the 64×64 array), so that the final fan-out has better locality. Alternatively, a "group" could perform a local FAA in stage one, then one node from each group could participate in a FAA for stage two, and a fan-out could result in stage three.

Such a three-stage FAA can eliminate the need for order independence and achieve correctness; however, the three-stage FAA may include a performance penalty relative to the two-stage example. Further, in addition to the time to performing the FAA twice, the three-stage FAA operation can include a local data fan-out. The fastest way to implement such an operation can optionally be with a local multicast. Alternatively, a pipelined ring broadcast could be implemented over the result.

Furthermore, for the three-stage FAA, if a pipelined ring broadcast is applied for the third stage, then the first stage has to be as small as possible while allowing practical message sizes in the second stage. Since the first stage and third stage are the same size, applying a pipelined ring broadcast can minimize the time in the third stage.

In another embodiment, a hybrid of a two-stage and a three-stage FAA is provided. Specifically, FAA can be thought of as having two phases: in the first phase the FAA can compute partial results; and in the second phase the FAA can distribute those partial results to all nodes. The two-stage FAA can include two similar stages to yield compute-disseminate-compute-disseminate. The three-stage FAA can involve compute-disseminate-compute-disseminate-disseminate, and the final dissemination stage can be approximately as expensive as a compute-disseminate stage. Merging the final two dissemination phases can result in a different approach.

The second stage of the three-stage example differs from the second stage of the two-stage example because it has a much lower global bandwidth requirement; however, this can add a final stage to disseminate the result. In the "2.5" or two-and-half-stage FAA, the final two disseminate stages can be merged. The FAA in the first stage can operate in a similar way as the two-stage and the three-stage example. Further, the compute portion of the second stage matches the three-stage example.

For an N×M decomposition, M nodes have 1/M of the final result. In the three-stage case, these M nodes would send their portion of the result to each of the M−1 nodes. Instead, the "2.5"-stage FAA would have each node deliver 1/M data to each of the N×M nodes. If this can be implemented using multicast, then the "2.5"-stage FAA can achieve the similar performance characteristics as the two-stage FAA with substantially less global bandwidth in the compute phase of the second stage.

Figure 5A:
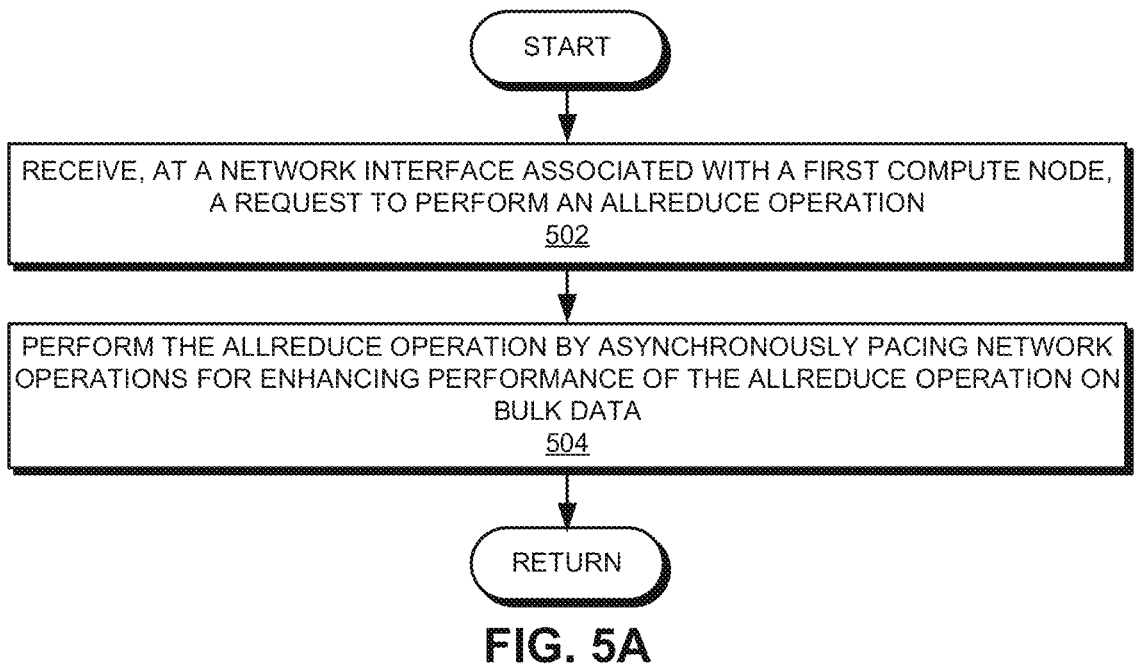
FIG. 5A presents a flowchart illustrating a process for implementing a network-interface-based allreduce operation, according to one embodiment.

FIG. 5A presents a flowchart illustrating a process for implementing a network-interface-based allreduce operation, according to one embodiment. During operation, the system can receive, at a network interface, a request to perform an Allreduce operation (operation 502). The network interface can be associated with a first compute node in a network including a plurality of compute nodes. In response to receiving the request, the system can perform the allreduce operation by pacing network operations involved in the allreduce (operation 504). Pacing of network operations can involve adding flow control to triggered operations for enhancing the performance of the allreduce operation. Triggered operations facilitate asynchronous scheduling of one or more message operations that are initiated when a pre-specified condition is satisfied. The number of triggered operations can depend on a size of the input buffer and a number of compute nodes in the network.

Figure 5B:
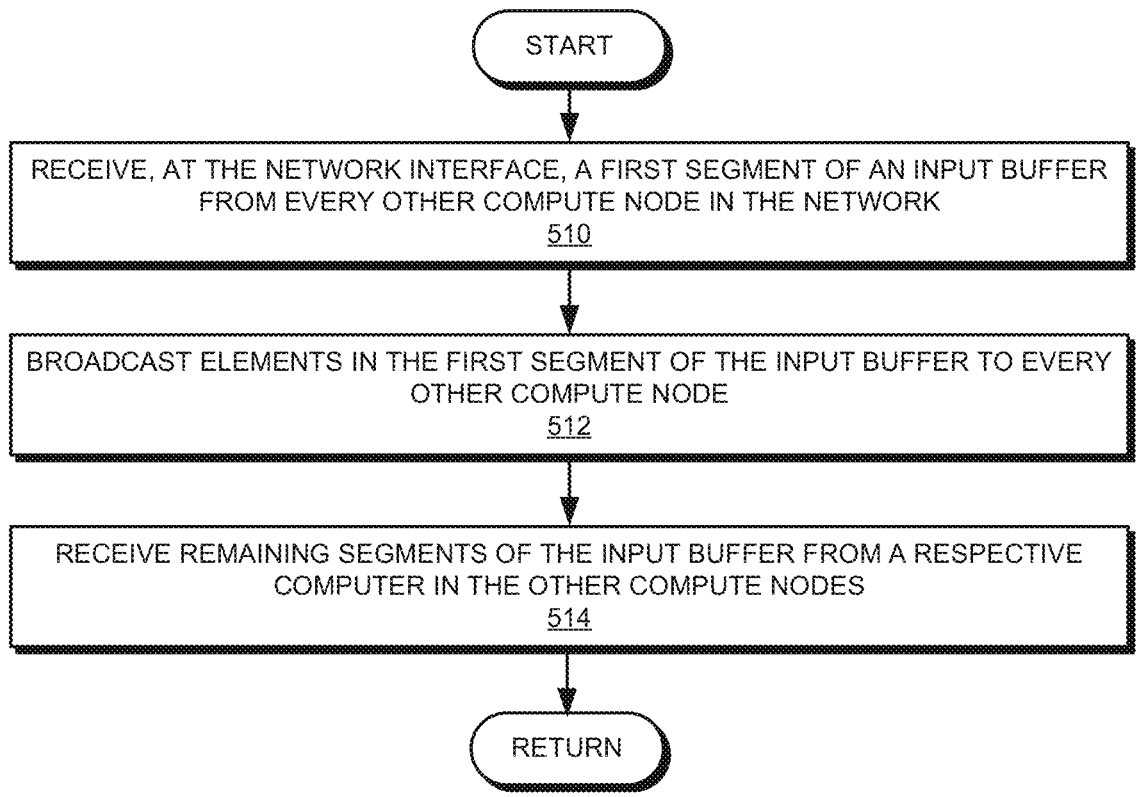
FIG. 5B presents a flowchart illustrating the allreduce operation corresponding to FIG. 5A, according to one embodiment.

FIG. 5B presents a flowchart illustrating the allreduce operation corresponding to FIG. 5A, according to one embodiment. During operation, the system can perform an allreduce operation. Specifically, in response to receiving a request to perform an allreduce operation, the system can receive via the network interface input data from a first compute node (operation 510). The system can store the input data in a local buffer. The system can then segment the input buffer into N segments, where N denotes the number of nodes in the network. The system can then broadcast elements in a first segment of the input buffer to N−1 compute nodes, i.e., N−1 copies of the first segment are sent from the first node and each of the remaining N−1 nodes receive a copy of the first segment (operation 512). The system may then receive data for the remaining N−1 segments in the input buffer from a respective compute node (operation 514).

The system can control the flow of the network operations by asynchronously scheduling one or more message operations. The system can initiate these message operations when a pre-specified condition is satisfied. Furthermore, the system can apply initiator side pacing and/or target side pacing to improve the performance of the allreduce operation. In addition, the system can implement the allreduce operation by applying one or more of the three different variations, i.e., two-stage hierarchical allreduce, three-stage hierarchical allreduce, or a two-and-a-half-stage hierarchical allreduce.

Exemplary Computer System and Apparatus

Figure 6:
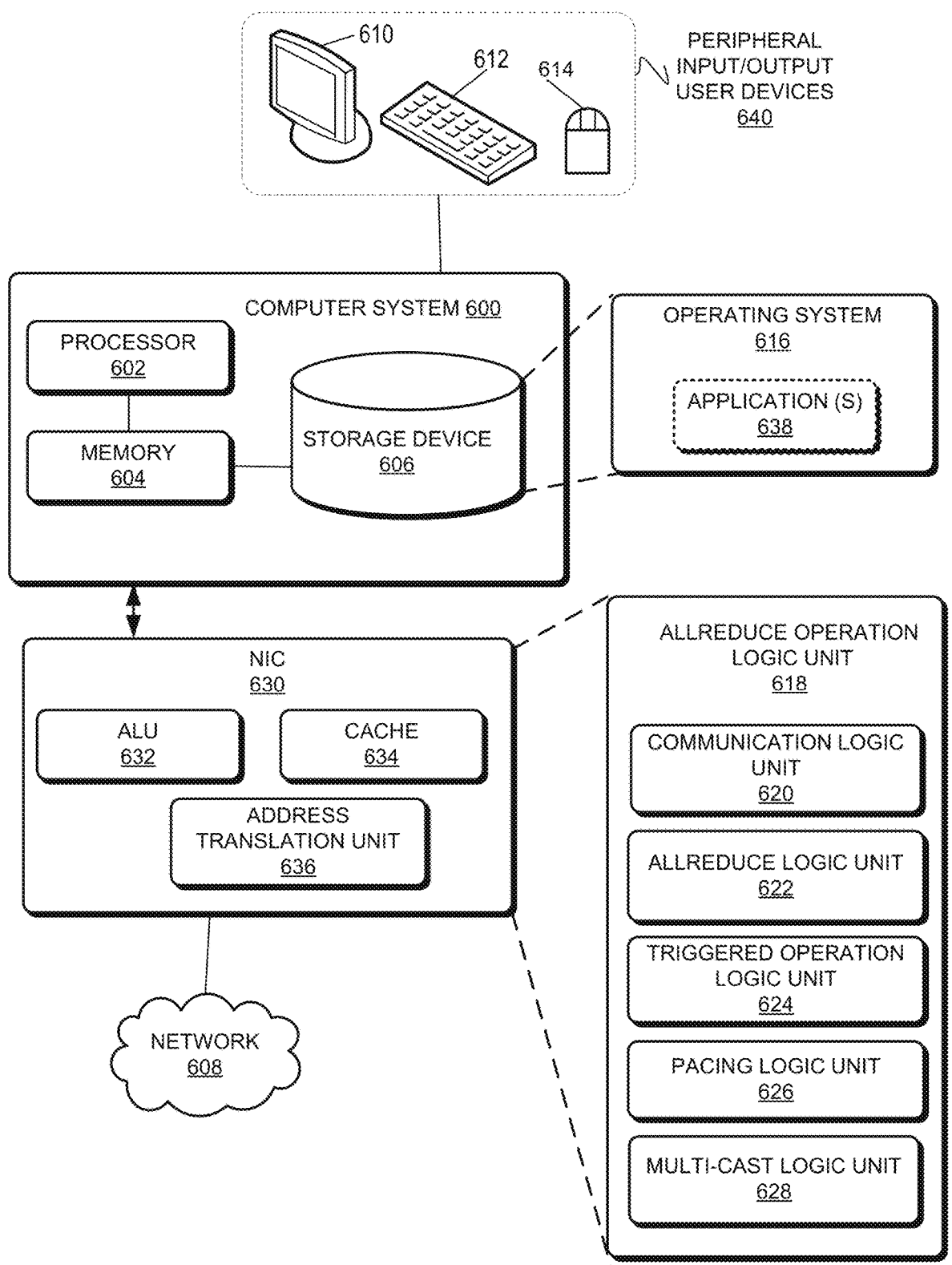
FIG. 6 illustrates an exemplary computer system that facilitates implementing a network-interface-based allreduce operation, according to one embodiment.

FIG. 6 illustrates an exemplary computer system equipped with a NIC that facilitates implementing a network-interface-based allreduce operation, according to one embodiment. In this example, computer system 600 can include a processor 602, a memory 604, a storage device 606. Computer system 600 can be coupled to peripheral input/output (I/O) user devices 640, e.g., a display device 610, a keyboard 612, and a pointing device 614. Storage device 606 can store instructions for an operating system 616. One or more applications 638 can operate on operating system 616.

Computer system 600 can be equipped with a host interface for coupling a NIC 630. NIC 630 can include an ALU 632, a cache 634, and an address translation unit 636. NIC 630 can be coupled to a network 608 via a network interface. NIC 630 can include an allreduce operation logic unit 618 to perform methods and/or processes described in this disclosure. Allreduce operation logic unit 618 can include a communication logic unit 620, an allreduce logic unit 622, a triggered operation logic unit 624, a pacing logic unit 626, and a multi-cast logic unit 628.

Communication logic unit 620 can send and/or receive data packets from other compute nodes in network 608. Allreduce logic unit 622 can implement the allreduce algorithm described in this disclosure. A triggered operation logic unit 624 can set up network operations that can be asynchronously triggered when other network operations are completed. Pacing logic unit 626 can leverage the triggered operations in triggered operation logic unit 624 to add flow control. A multicast logic unit 628 can reduce the number of triggered operations performed by each compute node.

Communication logic unit 620 can receive incoming data packets from the other nodes in network 608. The incoming data packets can be accumulated in one or more buffers in cache 634 at the full bandwidth. This can be achieved by ALU 632 that can operate at the line rate. ALU 632 can perform arithmetic operations on bulk data and organize the data, thereby accelerating the allreduce operation in NIC 630. Cache 634 can optimize the latency involved in combining and forwarding the results to other nodes in network 608. Address translation unit 636 can enable a region to be flagged as being cacheable to use local cache 634, thereby separating cacheable memory from non-cacheable memory. In other words, address translation unit 636 can implement a novel tagging operation that can identify which operations can target certain regions in cache 634. Such a flagging/tagging operation is desirable to simplify software management of the cache to arrive at a consistent state.

One embodiment described in the present disclosure can provide an apparatus. The apparatus can include: a network interface to transmit and receive data packets over a network; a memory including one or more buffers; an arithmetic logic unit to perform arithmetic operations for organizing and combining the data packets; and a circuitry. The circuitry is further to receive, via the network interface, data packets from the network; aggregate, via the arithmetic logic unit, the received data packets in the one or more buffers at a network rate; and transmit, via the network interface, the aggregated data packets to one or more compute nodes in the network, thereby optimizing latency incurred in combining the received data packets and transmitting the aggregated data packets, and hence accelerating a bulk data allreduce operation.

In a variation on this embodiment, the circuitry is further to perform local buffering to store the received data packets in an undetermined order to facilitate arithmetic operations in a pre-determined order.

In a variation on this embodiment, the apparatus further includes an address translation logic for enabling a region in the memory to be marked as being cacheable.

In a variation on this embodiment, the address translation logic is further to determine, based on address information associated with one or more operations, whether the one or more operations target the memory region marked as cacheable, thereby providing control of information in the cacheable memory region to enable a consistent state for the information associated with the one or more operations.

In a variation on this embodiment, the address translation logic facilitates a software management of the memory.

In a further variation, the arithmetic logic unit operates to match the network rate.

One embodiment can provide a system and method for performing an allreduce operation. During operation, the system can receive, at a network interface associated with a first compute node in a network, a request to perform an allreduce operation, wherein the network includes a plurality of compute nodes. The system can then perform the allreduce operation by pacing network operations for enhancing performance of the allreduce operation on bulk data. The system can perform the allreduce operation by receiving, at the network interface, a first segment of an input buffer from every other compute node in the network; broadcasting elements in the first segment of the input buffer to every other compute node; and receiving remaining segments of the input buffer from a respective compute node in the other compute nodes.

In a variation on this embodiment, the system can receive via the network interface, input data from the first compute node. The system can then segment, based on the number of compute nodes in the network, the input data.

In a variation on this embodiment, the system can implement the allreduce operation by applying a multi-stage hierarchical allreduce.

In a further variation on this embodiment, the multi-stage hierarchical allreduce can include one or more of: a two-stage hierarchical allreduce; a three-stage hierarchical allreduce; and a two-and-a-half stage hierarchical allreduce.

In a further variation on this embodiment, the paced operations can involve adding flow control to triggered operations. The paced operations can include one or more of: initiator side pacing and target side pacing.

In a further variation on this embodiment, the initiator side pacing can include counting, based on a counter, a number of incoming atomic operations; and pacing, based on a pre-specified counter threshold, outgoing operations to peer compute nodes in the network.

In a further variation on this embodiment, the target side pacing is applied when a per-compute node segment is large. Further, the target side pacing involves releasing additional atomic operations based on a completion count for an atomic operation.

In a further variation on this embodiment, the system can implement the allreduce operation by performing triggered operations which facilitates asynchronous scheduling of one or more operations that are initiated when a pre-specified condition is satisfied.

In a further variation on this embodiment, the number of triggered operations depends on a size of the input buffer and a number of compute nodes in the network. The number of triggered operations can be reduced by adjusting the granularity of flow control.

In a further variation on this embodiment, the system can apply a multicast operation to send results of allreduce operation to other compute nodes in the network.

In a further variation on this embodiment, the system can perform local buffering to store the received data packets in an undetermined order to facilitate arithmetic operations in a pre-determined order.

In a further variation on this embodiment, the system can perform local buffering by storing the data packets in the local buffer and then applying arithmetic operations; and storing incoming atomic operations prior to sending notification messages, thereby combining the local buffering with flow control.

In a further variation on this embodiment, the system can apply a counter per-M-peer compute nodes to release one or more atomic operations when the counter increments to M, In a further variation on this embodiment, incrementing the counter by M can include a synchronous operation which involves releasing additional atomic operations for each increment by M, The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. An apparatus, comprising:
a network interface to transmit and receive data packets over a network;
a memory comprising one or more buffers;
an address translation logic for enabling a region in the memory to be marked as being cacheable;
an arithmetic logic unit to perform arithmetic operations for organizing and combining the data packets; and
a circuitry to:
receive, via the network interface, data packets from the network;
aggregate, via the arithmetic logic unit, the received data packets in the one or more buffers at network rate;
transmit, via the network interface, the aggregated data packets to one or more compute nodes in the network, thereby optimizing latency incurred in combining the received data packets and transmitting the aggregated data packets, and hence accelerating a bulk data allreduce operation.

2. The apparatus of claim 1, wherein the circuitry is further to:
perform local buffering to store the received data packets in an undetermined order to facilitate arithmetic operations in a pre-determined order.

3. The apparatus of claim 1, wherein the address translation logic is further to: determine, based on address information associated with one or more operations, whether the one or more operations target the memory region marked as cacheable, thereby providing control of information in the cacheable memory region to enable a consistent state for the information associated with the one or more operations.

4. The apparatus of claim 1, wherein the address translation logic facilitates a software management of the memory.

5. The apparatus of claim 1, wherein the arithmetic logic unit operates to match the network rate.

6. A method for performing an allreduce operation, the method comprising:
receiving, at a network interface associated with a first compute node in a network, a request to perform an allreduce operation, wherein the network includes a plurality of compute nodes; and
performing the allreduce operation by pacing network operations for enhancing performance of the allreduce operation on bulk data, wherein the allreduce operation comprises:
receiving, at the network interface, a first segment of an input buffer from every other compute node in the network;
broadcasting elements in the first segment of the input buffer to every other compute node; and
receiving remaining segments of the input buffer from a respective compute node in the other compute nodes, and
wherein the allreduce operation is implemented with a multi-stage hierarchical allreduce that includes one or more of:
a two-stage hierarchical allreduce;
a three-stage hierarchical allreduce; and
a two-and-a-half stage hierarchical allreduce.

7. The method of claim 6, further comprising:
receiving, via the network interface, input data from the first compute node; and
segmenting, based on the number of compute nodes in the network, the input data.

8. The method of claim 6, wherein the paced operations involve adding flow control to triggered operations; and
wherein the paced operations include one or more of:
initiator side pacing; and
target side pacing.

9. The method of claim 8, wherein the initiator side pacing comprises:
counting, based on a counter, a number of incoming atomic operations; and
pacing, based on a pre-specified counter threshold, outgoing operations to peer compute nodes in the network.

10. The method of claim 8, wherein the target side pacing is applied when a per-compute node segment is large, and wherein the target side pacing involves releasing additional atomic operations based on a completion count for an atomic operation.

11. The method of claim 6, wherein the allreduce operation involves performing triggered operations which facilitates asynchronous scheduling of one or more operations that are initiated when a pre-specified condition is satisfied.

12. The method of claim 11, wherein a number of triggered operations depends on a size of the input buffer and a number of compute nodes in the network, and wherein the number of triggered operations is reduced by adjusting granularity of flow control.

13. The method of claim 6, further comprising:
applying a multicast operation to send results of a reduce operation to other compute nodes in the network.

14. The method of claim 6, further comprising:
performing local buffering to store the received data packets in an undetermined order to facilitate arithmetic operations in a pre-determined order.

15. The method of claim 14, wherein performing local buffering further involves:
storing the data packets in the local buffer and then applying arithmetic operations; and
storing incoming atomic operations prior to sending notification messages, thereby combining the local buffering with flow control.

16. The method of claim 6, further comprising:
applying a counter per-M-peer compute nodes to release one or more atomic operations when the counter increments to M.

17. The method of claim 16, wherein incrementing the counter by M includes a synchronous operation which involves releasing additional atomic operations for each increment by M.

18. The method of claim 16, wherein incrementing the counter by M includes a synchronous operation which involves sending notifications to a compute node that is pending a flow control release.

* * * * *